United States Patent [19]

Broughton

[11] E Patent Number: Re. 31,739

[45] Reissued Date of Patent: Nov. 20, 1984

[54] LIGHTLY PRIZED TOBACCO

[75] Inventor: James A. Broughton, Prospect, Ky.

[73] Assignee: Brown & Williamson Tobacco Corporation, Louisville, Ky.

[21] Appl. No.: 272,615

[22] Filed: Jun. 11, 1981

Related U.S. Patent Documents

Reissue of:

[64] Patent No.: 3,693,629
Issued: Sep. 26, 1972
Appl. No.: 148,967
Filed: Jun. 1, 1971

[51] Int. Cl.[3] ..... A24B 13/00

[52] U.S. Cl. ..... 131/111; 131/366; 131/367

[58] Field of Search ..... 131/111-119, 131/290, 292, 297, 298, 300, 309, 310, 347, 348, 352, 353, 354-359, 362, 364, 366, 367, 369-375, 900-903

[56] References Cited

U.S. PATENT DOCUMENTS

| | | | |
|---|---|---|---|
| 38,095 | 4/1963 | Cochran | 131/111 |
| 106,882 | 8/1870 | Spencer | 131/111 |
| 200,202 | 2/1878 | Kinney | 131/366 |
| 1,365,969 | 1/1921 | Dula | 131/366 |
| 3,223,090 | 12/1965 | Stubel et al. | 131/291 |

*Primary Examiner*—V. Millin
*Attorney, Agent, or Firm*—Charles G. Lamb

[57] ABSTRACT

A new form of chewing tobacco in cake form but with a low tensile strength such that it may be easily torn, broken, or bittin into smaller pieces.

6 Claims, No Drawings

LIGHTLY PRIZED TOBACCO

Matter enclosed in heavy brackets [ ] appears in the original patent but forms no part of this reissue specification; matter printed in italics indicates the additions made by reissue.

BACKGROUND OF THE INVENTION

Various chewing tobaccos have been marketed for a considerable period of time. Two of the major forms of chewing tobacco are a hard, dense plug which requires great force in order to be broken into smaller pieces for chewing, and loose processed leaves which, because of their form, require a relatively great volume for a given quantity of tobacco and which are subject to some losses because of an inability to completely place in the chewer's mouth the quantity taken from the storage pouch.

Persons who chew one of these two types of chewing tobacco would not generally switch between the two types. The chewer of plug would be unhappy with the "fluffiness" of the loose tobacco. The chewer of loose tobacco would generally not enjoy the plug because of the great force required to obtain a piece of chewing size. No product existed which found ready acceptance among both types of chewers of which combined the advantages of the two types of tobacco.

SUMMARY OF THE INVENTION

In accordance with the present invention, it has unexpectedly been discovered that a tobacco cake can be formed having properties such that it appeals both to chewers of the presently available plug and also to chewers of the loose, leaf type of chewing tobacco. This lightly prized cake is formed in such a way that it combines many of the features of the two types and, because of this relatively intermediate position, can be equally used and enjoyed by persons who formerly favored one type or the other of the referenced presently marketed chewing tobaccos.

The lightly prized cake tobacco of the present invention is distinguished from these formerly available types of chewing tobacco, in particular, by tensile strength, compressibility, and flexure. The unique combination of properties renders the product acceptable to a broad spectrum of consumers.

It is thus an object of the present invention to provide cakes of chewing tobacco which are formed in such a manner that a unique combination of properties results.

It is a further object of the present invention to provide chewing tobacco having a particular tensile strength such that it is acceptable to a broad spectrum of users.

DESCRIPTION OF THE PREFERRED EMBODIMENTS

In accordance with the present invention a chewing tobacco cake is formed in such a manner that its ultimate physical properties fall within particular ranges which render it desirable both to chewers of presently available plugs and to chewers of loose, leaf chewing tobacco. A cake with such properties can be formed a variety of ways, including particular control of the pressure of formation [, or by freeze drying. In the latter situation, for example, the cake can be formed according to the method described and claimed in U.S. Pat. No. 3,223,090 - Strubel et al., assigned to the same assignee as the present invention].

When the cake is to be formed by pressing or prizing, the proper amount of tobacco containing casings, flavorings, etc. is placed into a forming mold and pressure is applied for a sufficient period of time to obtain the desired physical properties. In general, the pressure is applied to a particular force level at which the contents of the mold have achieved a certain thickness and the pressure is then released. Upon release of pressure, the cake "springs back" to a thickness intermediate the original thickness and that achieved during the pressing or prizing operation. At this intermediate thickness, the desired physical properties are present.

In general, the most critical factor for the chewing tobacco according to the present invention is the tensile strength. This tensile strength should be less than 10 lbs. per sq. in., preferably from 1.0 to 6.0 lbs. per sq. in. Such a tensile strength is significantly less than the tensile strength of standard chewing tobacco plugs presently marketed, these materials ranging upwards of 17 lbs. per sq. in. tensile strength.

Of additional importance is the compressibility of the chewing tobacco of the present invention which should fall within the range of from [1.5] *about 1.2* to 20 lbs. per sq. in., as measured by the final force applied by a Chatillon compression gauge, or from 2.0 to 25.0 lbs. per sq. in., as initial force by the same testing equipment. By comparison, the final force for presently available plug materials is generally well above 20 lbs. per sq. in., and the initial force is above 40 lbs. per sq. in. Of course, the compression of loose, leaf chewing tobacco is unmeasurable in view of its form.

A third important criterion for the lightly prized tobacco of the present invention is the degree of flexing. The flex should be in the range of from 0.1 to 3 lbs. as a final force, or from [0.1] *about 0.3* to 4 lbs. as an initial force to bend the cake a distance of one-eighth in. at the center, with one-fourth in. of the cake supported in a testing apparatus. By comparison, standard plugs which are presently marketed have a force for flexure, under the same conditions, of over 3 lbs. final force and well over 5 lbs. initial force.

In forming the lightly prized cake of the present invention through pressing or prizing, a quantity of tobacco is placed into a mold. Such a mold may have an area measuring 3 in. by 2 in. A quantity of tobacco, generally ranging from 1.5 to 3.5 oz., and properly cased and flavored, is placed within this mold. A force is then applied to compress the tobacco to such a degree that, when the force is relieved, the cake will spring back to a height of about 1 in. In many situations, the initial compression creates a rectangularly shaped tobacco form with a thickness of approximately one-half in. prior to relieving the pressure. Thus, the finally formed cake has dimensions of 3 in. by 2 in. by 1 in., or a volume of 6 cubic in. Presently marketed tobacco chewing plugs have dimensions of about 3 in. by 2 in. by three-fourth in. or five-eighth in. It will also be apparent that a plurality of cakes can be simultaneously formed, e.g., by sizing a mold to form two to 12 or more cakes, placing the proper amount of tobacco in the mold for that number of cakes, and proceeding with steps described above. These cakes may then be cut to any desired area or shape. Continuous processing is also possible.

A particularly desirable casing for the lightly prized cake of the present invention may be licorice. The licorice may be applied in amounts of from about 2 to 8 percent, for example. In addition, other standard casings and flavorings, such as sugars, can be employed in the product. It is important that the moisture content of the tobacco during the light pressing or prizing be in the range of from about 18 to 23 percent, with many casings and flavorings.

In order that those skilled in the art may be better enabled to practice the present invention, the following examples are given. These examples should be considered as illustrative and not as limiting in any way the full scope of the invention as defined in the appended claims.

In the following examples, [the freeze dried cake is formed according to the method described and claimed in the aforementioned U.S. Pat. No. 3,223,090. The freeze dried cake had a quantity of 1.10 oz. of tobacco and a density of 0.18 oz. per cu. in. Four] *four* different types of cake were formed employing light pressure or prizing. In each case, the final cake had dimensions of 3 in. by 2 in. by 1 in. and was formed according to the method previously described. The primary difference in these cakes lay in the amount of tobacco contained within a given cake and the types of cakes are identified as below:

| Identification | Quantity of Tobacco Per Cake (oz.) | Density oz./in.$^3$ |
|---|---|---|
| Cake 1 | 1.75 | 0.29 |
| Cake 2 | 2.00 | 0.33 |
| Cake 3 | 3.00 | 0.50 |
| Cake 4 | 3.25 | 0.54 |

The presently available commercial plugs used for comparative testing had the following properties:

| Identification | Dimensions | Weight | Density |
|---|---|---|---|
| Plug No. 1 | 3 × 2 × ⅞ in. | 1.90 oz. | 0.5 oz./in.$^3$ |
| Plug No. 2 | 3 × 2 × ¾ in. | 2.04 oz. | 0.45 oz./in.$^3$ |

EXAMPLE 1

In this example, the tensile strength of both the products of the present invention and presently available commercial products were measured in a tensile tester. The jaws of the tester were pulled up tightly on the commercial plugs. With the cakes of the present invention, however, because of a low compression factor, the jaws were merely adjusted to a fixed distance. The distance employed was one-half in. for cakes numbers 1 and 2 and three-fourths in. for cakes numbers 3 and 4. The results were as follows:

| Product Identification | Average Tensile Strength (Lbs. Per Sq. In.) |
|---|---|
| Plug No. 1 (with tobacco wrapper) | 28.21 |
| Plug No. 1 (without wrapper) | 17.03 |
| Plug No. 2 (with tobacco wrapper) | 25.33 |
| Plug No. 2 (without wrapper) | 22.42 |
| Cake No. 1 | 1.32 |
| Cake No. 2 | 1.39 |
| Cake No. 3 | 5.31 |
| Cake No. 4 | 5.83 |

[Because of the fragile nature of the freeze dried cakes, it was impossible to determine a tensile strength, the strength is thus even lower than those set forth above for cakes 1 through 4.]

EXAMPLE 2

In this example, the compression of presently available commercial plugs and of cakes made according to the present invention were determined. A Chatillon compression gauge with a one-half in. diameter flat accessory foot attached was employed. The foot had an area of 0.196 in.$^2$ and each sample was compressed a distance of three-thirtyseconds in., with the initial compression force noted. This initial position was maintained for 60 seconds and the final force and depth were then recorded. The results were as follows:

| Product Designation | Initial Force Lbs. Per Sq. In. | Final Force Lbs. Per Sq. In. |
|---|---|---|
| Plug No. 1 | 42.6 | 23.54 |
| Plug No. 2 | 45.0 | 26.8 |
| [Freeze Dried Cake] | [2.26] | [0.78] |
| Cake No. 1 | 2.17 | 1.28 |
| Cake No. 2 | 3.08 | 1.67 |
| Cake No. 3 | 17.35 | 10.32 |
| Cake No. 4 | 21.58 | 15.19 |

EXAMPLE 3

The determination of the force required to flex the cakes of the present invention and standard commercial products was accomplished by clamping the cake or plug at the end for a distance of one-fourth in. between small metal rods. The center of the cake or plug was then bent downwardly a distance of one-eighth in. The initial flexing force was recorded and, after maintaining the cake or plug in the flexed position for 60 seconds, the final holding force was noted. The results were as follows:

| Product Designation | Initial Holding Force (Lbs.) | Final Holding Force (Lbs.) |
|---|---|---|
| Plug No. 1 | 6.35 | 3.94 |
| Plug No. 2 | 5.71 | 3.22 |
| Cake No. 1 | 0.32 | 0.14 |
| Cake No. 2 | 0.57 | 0.24 |
| Cake No. 3 | 2.97 | 1.83 |
| Cake No. 4 | 3.82 | 2.47 |
| [Freeze Dried Cake] | [0.15] | [0.10] |

It will thus be seen, according to the examples above, that the product of the present invention has physical properties significantly different from plugs presently available and from loosely packed chewing tobacco. These particular physical properties make the product desirable to a wide spectrum of users, providing properties not previously available. It will be seen that the products of the present invention have these unique physical properties whether more or less tobacco is contained in the present products, than is contained in presently available commercial products, or whether the densities of the products of the present invention are greater or less than those of presently available products.

Thus, a new chewing tobacco product has been described. However, the invention should not be considered as limited to the specific examples shown as preferred embodiments of the present invention.

I claim:

1. A chewing tobacco product comprising a block of tobacco having a non-cylindrical configuration and having a tensile strength of [less than] *from about 1.0*

*to* 10.0 lbs. per sq. in. and an initial compression of from 2.0 to 25 lbs. per sq. in. and a final compression of from [0.5] *about 1.2* to 20 lbs. per sq. in.

2. The product of claim 1 wherein the tensile strength is from 1.0 to 6.0 lbs. per sq. in.

3. The product of claim 1 having initial flex resistance of [0.1] *from about 0.32* to 4.0 lbs.

4. The product of claim 3 wherein the tensile strength is from 1.0 to 6.0 lbs. per sq. in.

5. A chewing tobacco product comprising a block of tobacco having a non-cylindrical configuration and having a tensile strength of [less than] *from about 1.0 to* 10.0 lbs. per sq. in. [and], initial flex resistance of [0.1] *about 0.32* to 4.0 lbs., *final flex resistance of about 0.1 to 3.0 lbs. per sq. in., an initial compression of about 2.0 to 25 lbs. per sq. in.* [and] a final compresision of from [0.5] *about 1.2* to 20 lbs. per sq. in.

6. The product of claim 5 wherein the tensile strength is from 1.0 to 6.0 lbs. per sq. in.

* * * * *